(12) United States Patent
Herzog et al.

(10) Patent No.: US 6,673,849 B2
(45) Date of Patent: Jan. 6, 2004

(54) COMPOSITES COMPRISING A HYDROPHILIC POLYESTER-POLYURETHANE FOAMED MATERIAL FOR VEHICLE INTERIOR TRIM

(75) Inventors: Klaus-Peter Herzog, Leverkusen (DE); Günther Baatz, Rösrath (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/955,227

(22) Filed: Sep. 14, 2001

(65) Prior Publication Data

US 2002/0036049 A1 Mar. 28, 2002

Related U.S. Application Data

(62) Division of application No. 09/513,089, filed on Feb. 25, 2000.

(51) Int. Cl.$^7$ .................. B32B 31/00; C08G 18/42; B01J 20/26
(52) U.S. Cl. .......................... 521/176; 156/82
(58) Field of Search ............... 156/82; 521/176

(56) References Cited

U.S. PATENT DOCUMENTS

| 3,413,245 A | | 11/1968 | Sambeth et al. |
| 3,806,474 A | | 4/1974 | Blair |
| 3,838,075 A | | 9/1974 | Dietrich et al. |
| 3,961,629 A | * | 6/1976 | Richter et al. ............... 604/369 |
| 5,650,450 A | | 7/1997 | Lovette et al. |
| 5,719,201 A | * | 2/1998 | Wilson ....................... 521/137 |

FOREIGN PATENT DOCUMENTS

| CA | 2247657 | 3/1999 |
| EP | 0 359 329 | 3/1990 |
| GB | 1326161 | 8/1973 |
| GB | 1419201 | 12/1975 |

* cited by examiner

*Primary Examiner*—Jeff H. Aftergut
(74) *Attorney, Agent, or Firm*—Joseph C. Gil; N. Denise Brown

(57) ABSTRACT

Composites comprising a polyurethane core and an outer facing layer are described in the present invention. Suitable polyurethane cores are hydrophilic polyester-polyurethane foamed materials which comprise the reaction product of:

(a) at least one polyisocyanate, with (b) at least one polyester polyol containing at least two hydroxyl groups and having an average molecular weight within the range from more than 700 to 10,000, and (c) at least one ethoxylated polyether polyol, containing at least two hydroxyl groups, having a molecular weight of at more than 700, a functionality of from 2 to 6, and having a degree of ethoxylation greater than 30% by weight, and (d) optionally, at least one compound containing at least two active hydrogen atoms and having an average molecular weight within the range from 32 to 700, and (e) catalysts, water and/or foaming agents, and (f) optionally, adjuvant substances and additives.

The present invention also relates to process for the production of these composite materials, and to the use of these composite materials for vehicle interior trim.

5 Claims, No Drawings

COMPOSITES COMPRISING A HYDROPHILIC POLYESTER-POLYURETHANE FOAMED MATERIAL FOR VEHICLE INTERIOR TRIM

CROSS-REFERENCE TO RELATED APPLICATIONS

This application is a divisional application of U.S. application Ser. No. 09/513,089, filed on Feb. 25, 2000.

BACKGROUND OF THE INVENTION

This invention describes composites comprising a polyurethane foam core and an outer layer of a textile material. Suitable polyurethane foam cores for the composite materials of the present invention comprise hydrophilic polyester-polyurethane foam materials. These composite materials can be used for the production of vehicle interior trim parts.

One important application of polyester-polyurethane foamed materials is the splitting of long blocks of block foamed material to form strip material, followed by further processing to produce composite materials suitable for use as interior trim parts in vehicles after lamination with textiles or sheeting materials.

Composite materials for vehicle trim are understood to mean textile-laminated PUR foamed materials such as, for example, seat or seat back upholstered supports.

It is predominantly textile-laminated strip material which forms the uppermost layer of upholstery in these areas. The textile-laminated strip material, after being cut and sewn to the seat or seat back support, is converted to the finished fitted part by upholstering it (mostly by hand hitherto) to the rest of the seat or seat back construction.

In addition to upholstering by hand, there is also a technique for the foam-backing of prefabricated seat and seat back supports or of other upholstery parts, such as, for example, head rests or arm rests, in a foam mold using a costly processing technique.

However, apart from manufacturing advantages, this results in specific disadvantages for parts "enveloped" by the climatic environment of the seat, such as, for example, seat and seat back supports. This is due to the lamination of vacuum-tight sheeting, which thus mostly exerts a diffusion-inhibiting effect, on to the back of textile-laminated strip material; but which is necessary due to the production technique employed. Alternatively, this technique results at least in the use of strip material which is particularly impermeable to air for the lamination operation.

If the strip material which is used according to the invention is of sufficient thickness, this disadvantage can also be compensated for, at least in part, by the moisture absorption behavior of the layer of foamed material which remains in the sandwich lamination (i.e., from the top side of the textile to the underside of the sheeting).

In sandwich laminations for customary upholstering by hand, however, the back of the strip is simply laminated to a wide-meshed knitted fabric which facilitates diffusion.

Apart from adhesive lamination, flame-lamination is a technique which has proved to be a particularly inexpensive. Flame lamination is, however, an efficient technique for joining strip materials made of flexible foamed materials to textiles and sheeting.

In a flame-lamination technique, foamed material strips are joined to textile strip material, in a continuous process at, for example, operating speeds within the range from 15 to 40 m/minute. This process comprises melting the surface of the foamed material by flaming (i.e., burning) it with a gas flame burner bar immediately before the textile strip is supplied. In addition to melting processes on the PUR matrix, decomposition reactions also occur on the surface. Immediately after being brought together, the textile and foamed material strips are pressed together by, for example, being passed between pairs of rotating rollers of the flame-laminating installation. After pressing, the melt which is formed on the surface of the foamed material has to form a relatively continuous bond.

Previously, these requirements have been fulfilled significantly better by ester-PUR foamed materials than by ether-PUR foamed materials, since during the laminating process the ether-PUR foamed materials form a melt which is considerably less viscous. Additionally, in comparison to ester-PUR foamed materials, the said melt shows a delayed viscosity build-up on cooling, which causes distinctly lower bond strength in the lamination process.

However, ether-PUR foamed materials possess properties which, in practice, make them highly suitable for use as upholstery materials. These include, for example, a significantly higher permeability to air at a comparable bulk density, and a considerably higher level of elasticity.

Ester-PUR foamed materials have a comparatively pronounced thermoplastic character, thus improving their capacity for flame-laminating. In addition, ester-PUR foamed materials with sufficiently open cell structure exhibit appreciable moisture absorption properties, and enable an improved seat climate, and thus, are expected to result in an increased level of seat comfort in one or the other upholstery situation.

Like polyester-PUR flexible foamed materials, polyether-PUR flexible foamed materials are preferably produced in a single-stage ("one shot") process. Details of the chemistry and process technology are given, for example, in the Kunststoff-Handbuch, Volume VII, Carl Hanser-Verlag Munich/Vienna, 3rd Edition (1993), on pages 193–220. This process results in block foamed materials (for further processing) which exhibit unsatisfactory hydrophilic properties, even when they are mainly of an open-cell character. Therefore, there have been numerous attempts aimed at improving this behavior by post-treating the foamed material matrix or by foaming it in conjunction with various different types of additives (see, for example, DE-A 2,207,356 and DE-A 2,207,361). These attempts have only achieved moderate success at considerable cost.

The object of the present invention was thus to provide polyurethane foamed materials which exhibit good hydrophilic properties and which are suitable for the production of composite materials which are particularly suitable for vehicle interior trim.

It has surprisingly been found that polyester-PUR foamed materials, which have been produced by replacing part of the polyester polyols in the formulations by polyether polyols which have a degree of ethoxylation greater than 30% by weight, achieve this object particularly well.

SUMMARY OF THE INVENTION

The present invention relates to a composite comprising a polyurethane core and at least one outer layer wherein the polyurethane core comprises hydrophilic polyester-polyurethane foamed materials. Suitable polyester-polyurethane foams materials comprise the reaction product of:

(a) at least one polyisocyanate, with (b) at least one polyester polyol containing at least two hydroxyl groups and having an average molecular weight of more than 700 to 10,000, (c) at least one ethoxylated polyether polyol containing at least two hydroxyl groups, having a molecular weight of more than 700 and a functionality of from 2 to 6, and having a degree of ethoxylation greater than 30% by weight, based on 100% by weight of alkoxylation, and (d) optionally, at least one compound containing at least two active hydrogen atoms and having an average molecular weight within the range of from 32 to 700, and (e) catalysts, water and/or foaming agents, and (f) optionally, adjuvant substances and additives.

These composite materials are particularly suitable to be used as vehicle interior trim.

The present invention also relates to a process for the production of these composite materials, and particularly to a continuous process for the production of a flame-laminated composite of textile and foamed material.

The degree of ethoxylation of the polyether polyols which are used is usually greater than 30% by weight, and is preferably between 50 and 95% by weight. Trimethylolpropane derived polyether polyols, and/or polyether polyols which are derived from glycerol, preferably highly ethoxylated polyether polyols which are derived from glycerol, are usually employed (e.g. VP PU41WB01, a trifunctional polyether polyol commercially available from Bayer AG).

The content of highly ethoxylated polyether polyols present in the polyol mixture is usually between 2 and 50% by weight, based on the combined weight of components b), c) and d).

Suitable polyester polyols can be produced by the condensation reaction of organic dicarboxylic acids, which contain 2 to 12 carbon atoms, and polyhydric alcohols.

Succinic acid, glutaric acid or adipic acid, or corresponding mixtures of dicarboxylic acids, are preferably used as the organic dicarboxylic acids.

Araliphatic dicarboxylic acids such as, for example, ortho- or terephthalic acid, or unsaturated carboxylic acids such as, for example, maleic and fumaric acid, can also be used.

When polyhydric alcohols are used as condensation reactants in the preparation of polyester polyols, they generally also contain from 2 to 12 carbon atoms.

Dihydric (glycol) reactants from the series ranging from ethylene glycol to 1,6-hexanediol are particularly preferred as polyhydric alcohols in the present invention. Diethylene glycol or dipropylene glycol are more preferred.

Small amounts of glycerol, trimethylol propane or homologues of higher functionality are often used in conjunction as polyhydric alcohol components of higher functionality which have a branching effect.

Polyester polyols prepared from adipic acid and diethylene glycol and 2 to 3 wt % of trimethylol propane as a branching agents (e.g. VP PU60WB01 or VP PU 60WB02, commercially available from Bayer AG), or other low-fogging formulations are preferably used.

Highly ethoxylated polyether polyols of higher functionality can also be used instead of highly ethoxylated polyether diols (difunctional) or highly ethoxylated triols, e.g. polyether polyols based on glycerine (such as VP PU41 WB01 of Bayer AG), and analogous products.

The stabilizers which are typically used are modern silicone stabilizers which result in a fine-celled foamed material structure which is as open-celled as possible. Examples of such stabilizers include compounds based on polydimethylsiloxane (e.g. VP Al 3613 or VP Al 3614 of Bayer AG, or B 8300 and B 8301 of Goldschmidt AG).

The proportion of highly ethoxylated polyether polyols in the polyol mixture for the composites of the present invention typically ranges between about 2 and 50%, based on the combined weight of component b), c) and d).

The functionality of the ethoxylated polyether polyols, as determined by the starter molecule, is usually between 2 and 6. Trifunctional components are particularly preferred.

Due to the possibility of mixing different types of polyester polyols for the foaming operation, the important and desired properties of the resultant foamed materials can be adjusted to suit the intended application.

Thus, the requirements of DIN 75201 (low fogging norm for interior trim parts) can be fulfilled without problems by the use of polyester polyols of a low-fogging formulation such as polyester polyols characterized by an OH number of 60 or 52, respectively, which are the reaction product of adipic acid and diethylene glycol and trimethylol propane as the branching component and have been processed by short-path distillation to remove volatile constituents such as cyclic diethylene glycol esters (e.g. VP PU 60WB01 or VP PU 60WB02 of Bayer AG).

When comparing a polyol comprising 3 wt % of trimethylolpropane (VP PU 60WB01) with a polyol comprising 2 wt % of trimethylol propane (VP PU 60WB02), the latter additionally provides the higher level of properties of "textile ester foamed materials". This difference means that the properties of the resultant foams correspond approximately to the property spectrum of foamed materials which are based on commercially available polyester polyols of a comparable structure but which give rise to fogging in the resultant foams (e.g. DE 2300 and DE 2200 of Bayer AG).

In order to further reduce the contribution to fogging, the substances which are used to catalyze the foaming reaction, apart from the customary amine components (see the Kunststoff-Handbuch, Volume VII, Carl Hanser-Verlag, Munich/Vienna, 3rd Edition (1993), pages 104–107 and page 219) can predominantly comprise those which contribute little to the odor or fogging of the resultant foamed materials. These include, for example, various compounds as described below.

Dimethylpiperazine, bis-(dimethylaminoethyl) ether (available as either Niax A 30 supplied by OSI, or as Dabco BL 11 supplied by Air Products; each of which are in the form of preparations), or dimethyl-ethanolamine and N,N,N-trimethyl-N-hydroxyethyl-bisaminoethyl ether (available as Desmorapid KE 9645 supplied by Rhein-Chemie) are set forth as examples which can be incorporated into the foam formulation. Another example is 1,2-dimethylimidazole (available as Dabco 2039 supplied by Air Products), or different types of mixtures of amines or urea/amine combinations such as these.

Other adjuvant substances and additives are optionally added in order to influence other properties. Examples thereof include flame retardants, emulsifiers, dispersing agents, adjuvant substances to improve the ease of punching out the material, or antioxidants to prevent discoloration of the core.

The foamed materials can be produced with bulk densities within the range of from about 20 to 80 kg/m$^3$, which is customary for polyester-PUR foamed materials. By also using additional foaming agents, such as, for example, by means of liquid carbon dioxide (e.g. by employing the NovaFlex technique (Hennecke/Bayer AG) and/or related processes, or by employing a reduced pressure technique or analogous techniques), the range of uses and the possibilities of use can be widened correspondingly. The density of the foamed material preferably falls within the range of the specifications of the automobile industry, namely from about 25 to about 45 kg/m$^3$. Since on the one hand the water absorption capacity increases with increasing bulk density, and on the other hand the wetting capacity (i.e., the accessible internal surface of the foamed material) depends on the extent of open-cell character of the foamed material which is achieved, and the latter normally decreases with increasing bulk density, the range of bulk density of from 30 to 40 kg/m$^3$ is particularly preferred.

The foamed materials which are used in accordance with the present invention exhibit hydrophilic properties. They are capable of absorbing 10 times the amount of water, with respect to the weight of foamed material, within 20 to 25 seconds. When the dry foamed materials (i.e., foamed materials comprising a proportion of polyether polyol of from about 10% by weight in the polyol mixture) are placed on the surface of water, the foamed material sample sinks within seconds.

This occurs without swelling of the foamed material matrix, up to a content of about 30% by weight of these special polyether polyols (i.e., highly ethoxylated) as described above in the polyol mixture. This is definitely desirable for some applications.

A higher proportion of the highly ethoxylated polyether polyol results, in addition, in appreciable swelling of the foamed material matrix.

As strip material, the PUR foamed materials can be used for the production of foamed material-textile composite materials which are manufactured in the form of sandwich laminates, by adhesive or flame lamination. The polyester-PUR foamed materials are preferably used for the production of flame-laminated textile composite materials.

The addition of short-chain, generally linear glycols, or the addition of phosphorus-containing organic compounds, which impart a satisfactory level of initial and final strength to the material bond, has proved to be particularly advantageous when the materials according to the invention are used in a flame-laminating operation. Some examples of suitable additives of this type include, but are not limited to, aliphatic diols of the general formula HO—(R—CH)$_n$—OH, wherein n can be an integer within the range from 2 to 15 and R can be an alkyl or alkoxy group, as well as oligomeric polyoxypropylene glycols, polyoxyethylene glycols, propoxylation and ethoxylation products of polyhydric alcohols, or aliphatic and aromatic polyester glycols with molecular weights ranging from about 32 to 700, or OH-functional esters of phosphoric or phosphorous acid (such as Levagard 4090 N of Bayer AG, or Weston 430, commercially available from General Electric Spec. Chemicals).

The following substances can be used as polyisocyanates for the production of the polyester-PUR foamed materials:

Aliphatic, cycloaliphatic, araliphatic, aromatic and heterocyclic polyisocyanates such as those described by W. Siefken in Justus Liebig Annalen der Chemie, 562, pages 75 to 136, including, for example, those corresponding to the general formula:

$$Q(NCO)_n,$$

wherein:
 n represents an integer of from 2 to 4, preferably 2 to 3, and
 Q represents an aliphatic hydrocarbon radical containing 2 to 18 carbon atoms, preferably 6 to 10 carbon atoms, a cycloaliphatic hydrocarbon radical containing 4 to 15 carbon atoms, preferably 5 to 10 carbon atoms, an aromatic hydrocarbon radical containing 6 to 15 carbon atoms, preferably 6 to 13 carbon atoms, or an araliphatic hydrocarbon radical containing 8 to 15 carbon atoms, preferably 8 to 13 carbon atoms.

Examples of such suitable polyisocyanates include those which are described in, for example, DE-OS 2,832,253, pages 10 to 11.

In general, the polyisocyanates which are particularly preferred are those which are readily accessible industrially, e.g., 2,4- and/or 2,6-toluene diisocyanate and any mixtures of these isomers ("TDI"), polyphenylpolymethylene polyisocyanates such as those which are produced by aniline-formaldehyde condensation and subsequent phosgenation ("MDI"), and polyisocyanates which comprise carbodiimide groups, urethane groups, allophanate groups, isocyanurate groups, urea groups or biuret groups (modified polyisocyanates), particularly those modified polyisocyanates which are derived from 2,4- and/or 2,6-toluene diisocyanate or from 4,4'- and/or 2,4'-diphenylmethane diisocyanate.

The mixtures of TDI isomers T 80 and T 65 which are usually employed, and mixtures thereof, are particularly preferred.

Due to the option of varying the admixture of highly ethoxylated polyether polyols within wide limits, and due to the possibility of using different types of polyester polyols for the foaming operation, the properties of the foamed materials can easily be adjusted to achieve the desired values.

Thus, even admixing 5% of a polyether polyol which comprises a high degree of ethoxylation is sufficient to achieve a significant increase in the water absorption capacity of the resultant foamed material. On the other hand, such a low level of polyether polyol means that polyester-PUR foamed materials are produced for which the initial level of properties is substantially retained.

The invention is explained in greater detail by the following examples. The numerical data in the formulations should be understood as meaning parts by weight with respect to 100 parts by weight of polyol. The invention is further illustrated but is not intended to be limited by the following examples in which all parts and percentages are by weight unless otherwise specified.

EXAMPLES

Production of Foamed Materials

The reaction components were reacted by known, customary methods, wherein motor-driven devices were usually employed.

Details of the processing conditions which are suitable according to the invention are described in, for example, the Kunststoff-Handbuch, Volume VII, Carl Hanser-Verlag, Munich/Vienna, 3rd Edition, 1993, on pages 193–220.

The following components were used in the examples of this invention:

Polyol A: a low fogging polyester polyol prepared from adipic acid, diethylene glycol and 3 wt % of trimethylol propane, having an OH number of 60 (VP PU 60WB01 of Bayer AG);

Polyol B: a trifunctional polyether polyol based on glycerine and having an OH number of 37 and a degree of ethoxylation of at least 70% by weight (VP PU 41WB01 of Bayer AG);

Polyol C: an ethoxylated bisphenol A having an OH number of about 270 to about 285 (commercially available as Dianol 240/1 from Akzo-Chemie);

Polyol D: a low fogging polyester polyol prepared from adipic acid, diethylene glycol and 2 wt % of trimethylol propane having an OH number of 52 (VP PU 60WB01 of Bayer AG);

Polyol E: a difunctional polyether polyol based on propylene glycol and having an OH number of 57 and a degree of ethoxylation of at least about 49% by weight;

Polyol F: a short-chain aromatic polyester polyol having an OH number of between about 300 and 330 (Stepanpol PS 3152 of Stepan, Ill./USA);

Additive A: tris(dipropylene glycol) phosphite, a phosphorus-containing additive having an OH number of about 395 (Weston 430 of General Electric Spec. Chem.);

Stabilizer A: a silicone stabilizer based on polydimethylsiloxane (VP Al 3613 of Bayer AG);

Stabilizer B: a silicone stabilizer based on polydimethylsiloxane (B8301 of Th. Goldschmidt AG)

Catalyst A: an amine catalyst (Niax A 30 of OSI)

Catalyst B: an amine catalyst (RC-A-117 of Rhein Chemie)

Isocyanate A: an isomeric mixture of 2,4-toluene diisocyanate and 2,6-toluene diisocyanate in a weight ratio of 80:20

Isocyanate B: an isomeric mixture of 2,4-toluene diisocyanate and 2,6-toluene diisocyanate in a weight ratio of 65:35

The components were intensively mixed with one another in accordance with the given formulations, and were reacted.

Example 1

| | |
|---|---|
| Polyol A: | 90 parts by weight |
| Polyol B: | 10 parts by weight |
| Water | 3.0 parts by weight |
| Stabilizer A: | 1.5 parts by weight |
| Catalyst A: | 0.2 parts by weight |
| Catalyst B: | 0.2 parts by weight |
| Isocyanate A: | 19.0 parts by weight |
| Isocyanate B: | 19.0 parts by weight |

Flame lamination on a lab scale flame laminator of a 7 mm strip of the foamed material produced from the above described formulation in Example 1 with polyester textile sheeting (of automobile quality) resulted in peeling strength values, according to DIN 53 357, of 9 to 11 N/5 cm after 24 hours.

Example 2

| | |
|---|---|
| Polyol A: | 85 parts by weight |
| Polyol B: | 10 parts by weight |
| Polyol C: | 5 parts by weight |
| Water: | 3 parts by weight |
| Catalyst A: | 0.2 parts by weight |
| Catalyst B: | 0.2 parts by weight |
| Stabilizer A: | 1.5 parts by weight |
| Isocyanate A: | 19.7 parts by weight |
| Isocyanate B: | 19.7 parts by weight |

Flame lamination on a lab scale flame laminator of a 7 mm strip of the foamed material produced from the formulation described above in Example 2 with polyester textile sheeting (of automobile quality) resulted in peeling strength values (in accordance with DIN 53 357) of 13 to 15 N/5 cm after 24 hours.

Examples 3 to 6

In Examples 3–6, foams were prepared from the formulations set forth in Table 1 below.

TABLE 1

| Formulation | Example 3 | Example 4 | Example 5 | Example 6 |
|---|---|---|---|---|
| Polyol D (pbw) | 80 | 80 | 80 | 60 |
| Polyol B (pbw) | | | | 35 |
| Polyol E (pbw) | 20 | 15 | 15 | |
| Additive A (pbw) | | | 5 | 5 |
| Polyol F (pbw) | | 5 | | |
| Water | 3 | 3 | 3 | 3 |
| Stabilizer A (pbw) | 1.5 | | 1.5 | 1.5 |
| Stabilizer B (pbw) | | 1.5 | | |
| Catalyst A (pbw) | 0.2 | 0.2 | 0.2 | 0.2 |
| Catalyst B (pbw) | 0.2 | 0.2 | 0.2 | 0.2 |
| Isocyanate A (pbw) | 18.5 | 19.4 | 19.8 | 12.9 |
| Isocyanate B (pbw) | 18.5 | 19.4 | 19.8 | 25.8 |

Determination of Hydrophilic Character:

In order to determine their hydrophilic character, each of the foamed materials produced in Examples 1–6 as described above were tested against a standard ester foamed material of a low-fogging formulation, in a simulation test which was specific to the application. The formulation of this standard foamed material was as follows:

Standard Foam

| | |
|---|---|
| Polyol D: | 100 parts by weight |
| Water: | 3.0 parts by weight |
| Stabilizer A: | 1.0 parts by weight |
| Catalyst A: | 0.2 parts by weight |
| Catalyst B: | 0.2 parts by weight |
| Isocyanate A: | 18.4 parts by weight |
| Isocyanate B: | 18.4 parts by weight |

The tests were performed as follows:

1. The dry foamed materials were placed on the surface of water. Each of the foamed materials produced in Examples 1 to 6 sank completely within 25 seconds, in accordance with their hydrophilic character. By comparison, when the dry standard foam material was placed on the surface of the water, it floated on the surface for more than 1 hour. However, when moist foamed materials from which the water had substantially been removed were placed on the surface of the water, the hydrophilic foamed materials of Examples 1–6 sank within 2 seconds. By comparison, the standard foamed material again floated on the surface of the water for more than 1 hour.

2. Water was deposited on a dry foamed material surface by means of a wash-bottle. The foamed materials produced by the formulations in Examples 1–6 above (i.e., in accordance with the invention), which were of a hydrophilic formulation, absorbed the water directly by suction. By comparison, when water was deposited on the dry surface of the standard foamed material, the water drops remained on the surface as spheres, namely in the form in which they were deposited.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A vehicle trim composite comprising a polyurethane core and at least one outer layer in which (1) the polyurethane core is hydrophilic polyester-polyurethane foamed materials, comprising the reaction product of (a) at least one polyisocyanate, with
(b) at least one polyester polyol containing at least two hydroxyl groups and having an average molecular weight in the range of from more than 700 to 10,000,
(c) at least one ethoxylated polyether polyol containing at least two hydroxyl groups, having a molecular weight of more than 700, a functionality of from 2 to 6, and a degree of ethoxylation greater than 30% by weight, and
(d) optionally, at least one compound containing at least two active hydrogen atoms and having an average molecular weight within the range from 32 to 700, and
(e) catalysts, water and/or foaming agents, and
(f) optionally, adjuvant substances and additives.

2. The vehicle trim composite of claim 1, wherein component (c) the ethoxylated polyether polyol has a degree of ethoxylation of between 50 and 95% by weight.

3. The vehicle trim composite of claim 1, wherein component (c) the ethoxylated polyether polyol is present in an amount of from 2 to 50% by weight, based on the combined weights of components (b), (c) and (d).

4. The vehicle trim composite of claim 1, wherein the hydrophilic polyester-polyurethane foamed material additionally comprises (f) an additive comprising at least one phosphorus-containing compound.

5. A flame-laminated textile/foamed vehicle trim composite comprising a textile strip material continuously bonded to the surface of a foamed material, wherein the foamed material comprises a hydrophilic polyester-polyurethane foam comprising the reaction product of:
(a) at least one polyisocyanate, with
(b) at least one polyester polyol containing at least two hydroxyl groups and having an average molecular weight in the range of from more than 700 to 10,000,
(c) at least one ethoxylated polyether polyol which contains at least two hydroxyl groups, has a molecular weight of more than 700, a functionality of from 2 to 6, and which has a degree of ethoxylation greater than 30% by weight, and
(d) optionally, at least one compound containing at least two active hydrogen atoms and having an average molecular weight within the range from 32 to 700, and
(e) catalysts, water and/or foaming agents, and
(f) optionally, adjuvant substances and additives.

* * * * *